Aug. 23, 1966    M. H. ROMAN    3,267,724
MILK SEDIMENT TESTER
Filed June 8, 1964

INVENTOR.
MICHAEL H. ROMAN.
BY
ATTORNEY

United States Patent Office 3,267,724
Patented August 23, 1966

3,267,724
MILK SEDIMENT TESTER
Michael H. Roman, 18 Eugene St., Lowville, N.Y.
Filed June 8, 1964, Ser. No. 373,387
3 Claims. (Cl. 73—61)

This invention relates to milk sediment testing, and more particularly to handy apparatus for use in the field and wherein the usual cotton fiber filter disks are employed.

In my Patent 2,896,787 issued July 28, 1959, there is disclosed milk testing apparatus employing filter papers or media and requiring a source of vacuum for its operation. Such apparatus is highly useful around dairy barns, and the like which are equipped with vacuum operated milking machines, since a source of vacuum is readily available. However, the inspection of milk samples taken from large storage tanks, bulk cooling tanks, and the like, where no source of vacuum is available, presents a problem, since it is desirable to draw the milk through the test specimen by suction, rather than pumping it through under pressure. By employing vacuum, the apparatus that delivers the milk to the test disk may be relatively simple, easily cleaned, and thus introduction of extraneous matter during the test is avoided. However, in employing a source of vacuum such as is created by a vacuum pump, it is necessary to make sure that the milk undergoing test is not drawn into the vacuum pump. To minimize this possibility, it has been necessary to employ a tank or chamber in the vacuum line sufficiently large to catch or trap the tested milk by gravity. Such tanks are bulky, and constitute another item for cleaning.

The present invention is directed to a readily portable aspirator apparatus capable of operating from a domestic water supply, by attachment to a faucet or hose, the water flow creating sufficient vacuum for test purposes. The water employed to operate the aspirator washes away the milk, after it has passed through the filter test disk, and if connected to a faucet, the waste can flow down the drain such as is often associated with a water supply faucet. There is practically no place where milk is stored or produced that does not have available running water under pressure suitable for operating the apparatus.

More particularly, the invention comprises a short section of pipe having a filter disk seat with a standard aperture, for filtration, means for holding a standard filter disk on the seat, and means for delivering a predetermined test sample of milk to the disk, while subjecting the seat to vacuum produced by a water actuated aspirator.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
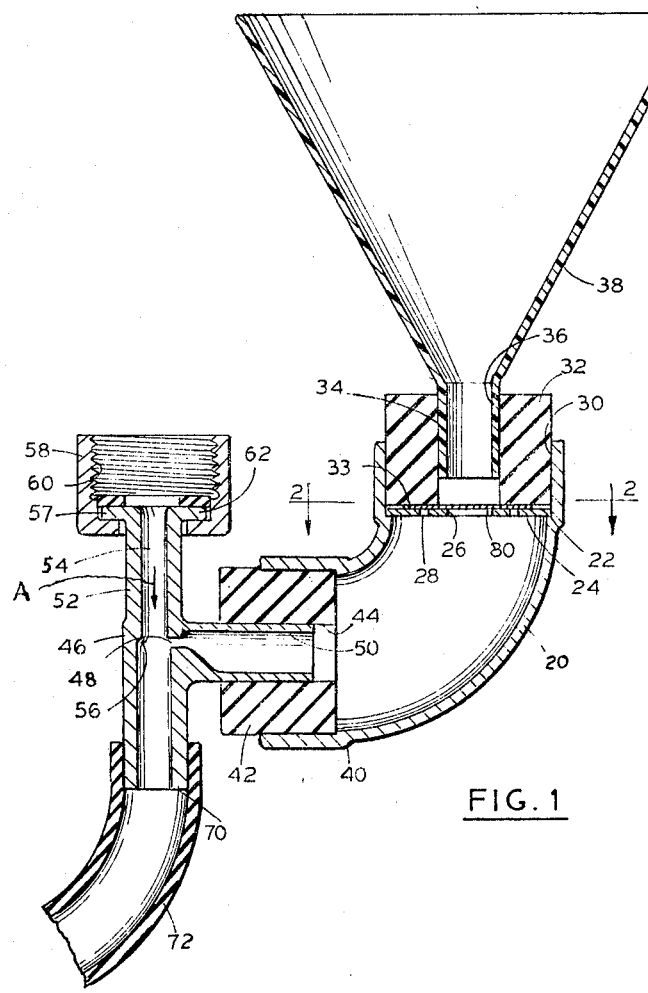
FIGURE 1 is a longitudinal sectional view through the apparatus.
Figure 2:
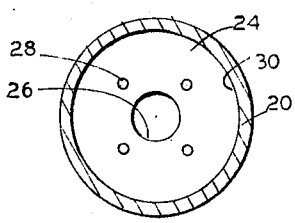
FIGURE 2 is a sectional view taken on the line 2—2 of FIGURE 1.

Referring to the drawings there is shown a short pipe or fitting 20, which for convenience may be a ninety degree elbow of a standard size such as 1½ inches, and formed of brass, copper, Monel, or the like. Within one end of the elbow, on the usual pipe shoulder 22, is affixed, as by soldering, a filter disk seat in the form of a thin circular plate 24. In the center of the plate is a standard filter aperture 26 of a diameter of 0.40 inch. Surrounding the center aperture, there may be provided if desired a plurality of relatively small apertures 28 arranged on a circle concentric with the aperture 26 of the plate will be about one and one half inches in diameter. Frictionally inserted into the open end 30 of the fitting 20 is a rubber plug 32, having an 0.40 inch center aperture 34 in alignment with the aperture 26. Such plug may have the discharge tube 36 of a funnel 38 of plastic or the like, inserted therein.

At the other end 40 of the fitting 20, there is provided a second rubber plug 42, which is frictionally held in place, and which has a central aperture 44. A common aspirator 46 having a side inlet port 48, and an inlet stem 50 projecting into the aperture 44 is provided. Such aspirator has a body portion 52, through which extends a bore 54, the diameter of which increases as at 56 in the region of the side inlet port 48. The inlet end of the body portion of the aspirator may be flanged as at 57, and provided with a female hose coupling sleeve 58, having female hose coupling threads 60, and a typical hose washer 62. Such coupling sleeve enables the aspirator to be coupled to a threaded hose faucet, or a length of hose, to supply water to the aspirator, or an adapter applied to a plain faucet. Water flows in the direction of arrow A.

The other end 70 of the aspirator may discharge into a sink drain below a faucet to which it is attached, or be provided with a convenient length of hose 72 to lead the waste to any desired place for disposal.

In operation, a test disk 80 of cotton fiber filter material of standard filtering capacity is seated on the plate 24, over the aperture 26, and apertures 28 if the latter are employed. A standard size for such disks is 1¼" in diameter. Thereafter the rubber cork or plug 32 is inserted. The lower end 33 of the plug may engage the peripheral portion of the filter disk 80, in which case the apertures 28 may be dispensed with, since the sole purpose of the small apertures 28 is to admit enough vacuum from the tube 20 to hold the marginal edge of the disk 80 seated on the plate 24.

When assembled, with a filter test disk 80 in place, water under pressure is caused to flow through the aspirator bore 54. The change in velocity due to the enlargement of the bore at 56, the change being a reduction in velocity, creates a subatmospheric pressure in the region of the port 48, and creates a vacuum in the tube 20 which may run as high as 24 to 26 inches of mercury. The degree of suction thus created renders it possible to employ ports 28 of extremely small diameter if necessary, and draws the milk through the port 26 at a rapid rate. In fact the suction tends to hold the plug seated upon the marginal edge of the disk, so long as milk is being drawn through the test specimen.

The vacuum thus created draws a standard measured amount of milk, poured into the funnel 38, through the central area of the filter disk 80 as defined by the seat port 26, which is of standard diameter. The filtered milk is drawn into the tube 20 and aspirated out through the aspirator discharge 70. After drawing the standard quantity of milk through the disk 80, the water is turned off, the plug 32 removed, and the disk 80 examined to determine the amount of sediment, and for comparison with standards, to ascertain the fitness of the milk.

It will be readily seen that all parts are readily disassembled for cleaning and that the entire device can be quickly readied for a subsequent test, and easily carried from place to place.

Milk producers can readily use the tester to check on the cleanliness of their milk before straining it. The tester may be used as a guide to encourage the production of clean sediment free milk rather than "cleaned milk." The filtering of a small portion of milk, prior to straining, may reveal udder abnormalities in the cow such as blood specks, mastitis clots, etc. The size of the apparatus is such as to operate on a very small quantity of test specimen, and can be quickly used to test the production of each cow if desired, without appreciable loss of production milk. At the same time, a milk inspector may make a milk inspection while employing a minimum quantity of milk as a specimen.

It will be seen that the plug 42, or the aspirator may be turned to any desired angle to accommodate inclined faucets, so that the filter disk end may be vertical which is the preferred position for uniform distribution during test. Similarly if coupled to hose, the aspirator can be inclined as desired so that apparatus can be conveniently held in one hand in upright position.

While a single modification of the invetion has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A milk sediment tester comprising a short tubular body member, open at both ends, a plate disposed across the member inwardly of one end by a short distance, said plate having a central circular aperture of predetermined diameter, a cotton filter disk disposed on said plate, a resilient plug frictionally inserted in the plate end of said member, and clamping the marginal edges of the cotton filter disk to said plate around said aperture, said plug having an aperture extending therethrough of a diameter corresponding to the plate aperture and in alignment therewith, a funnel means mounted in said plug aperture for delivery of test quantities of milk to said disk, a plug frictionally held in the other end of the member, said plug having a central aperture extending therethrough, and an aspirator having means for connection to a source of water pressure and having a side inlet port mounted in said last named plug aperture for establishing vacuum within the tubular member whereby upon flow of water through the aspirator to said discharge port, vacuum is created within said tubular member, to draw milk through said disk and discharge the same from said discharge port.

2. A milk sediment tester comprising a short tubular body member, open at both ends, a plate disposed across the member inwardly of one end by a short distance, said plate having a central circular aperture of predetermined diameter, a removable plug disposed in the plate end of said member, and adapted to clamp the marginal edge of a cotton filter disk upon said plate around the marginal edge of said aperture, said plug having an aperture extending therethrough of a diameter corresponding to and aligned with the plate aperture funnel means mounted in said plug aperture for receiving a test quantity of milk for delivery to the plate aperture, a plug removably held in the other end of the member, said plug having a central aperture therethrough, and a water actuated aspirator having its suction port connected to said last named plug aperture to create suction in said member.

3. A tester in accordance with claim 2, wherein tubular member is a right angle elbow, and wherein the aspirator is circular and may be set at any desired angle in reference to the elbow.

References Cited by the Examiner
UNITED STATES PATENTS

| | | | |
|---|---|---|---|
| 1,115,505 | 11/1914 | Chaplin | 210—406 |
| 2,896,787 | 7/1959 | Roman | 210—406 |

LOUIS R. PRINCE, *Primary Examiner.*